(12) United States Patent
Wang

(10) Patent No.: US 11,126,470 B2
(45) Date of Patent: Sep. 21, 2021

(54) ALLOCATION METHOD OF CENTRAL PROCESSING UNITS AND SERVER USING THE SAME

(71) Applicant: INDUSTRIAL TECHNOLOGY RESEARCH INSTITUTE, Hsinchu (TW)

(72) Inventor: Yu-Cheng Wang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 679 days.

(21) Appl. No.: 15/473,465

(22) Filed: Mar. 29, 2017

(65) Prior Publication Data

US 2018/0181438 A1    Jun. 28, 2018

(30) Foreign Application Priority Data

Dec. 22, 2016  (CN) .......................... 201611200418.2

(51) Int. Cl.
 *G06F 9/50* (2006.01)
(52) U.S. Cl.
 CPC .................. *G06F 9/5083* (2013.01)
(58) Field of Classification Search
 CPC .......................... G06F 9/5083; G06F 9/5027
 See application file for complete search history.

(56) References Cited

U.S. PATENT DOCUMENTS

| 6,711,607 B1 | 3/2004 | Goyal |
| 6,950,849 B1 | 9/2005 | Brandstätter |
| 7,200,219 B1 | 4/2007 | Edwards et al. |

(Continued)

FOREIGN PATENT DOCUMENTS

| CN | 1503150 A | 6/2004 |
| CN | 1643545 A | 7/2005 |

(Continued)

OTHER PUBLICATIONS

Jones, Michael B., Daniela Rocu, and Marcel-Cătălin Roşu. CPU reservations and time constraints: Efficient, predictable scheduling of independent activities. vol. 31. No. 5. ACM, 1997.

(Continued)

*Primary Examiner* — Bradley A Teets
*Assistant Examiner* — Willy W Huaracha
(74) *Attorney, Agent, or Firm* — Maschoff Brennan

(57) ABSTRACT

An allocation method for central processing units and a server using the allocation method are provided. The allocation method includes the following steps: testing a first efficacy of a server and recording a first number of first central processing unit(s) configured to perform a first task, a second number of second central processing unit(s) configured to perform a second task and the first efficacy; determining whether the first central processing unit(s) is in a busy state; increasing the first number when the first central processing unit(s) is in the busy state; determining whether a bandwidth occupied by the first task reaches a maximum bandwidth when the first central processing unit(s) is not in the busy state; increasing the second number when the bandwidth occupied by the first task does not reach the maximum bandwidth; continuously performing the aforementioned steps.

10 Claims, 5 Drawing Sheets

(56) References Cited

U.S. PATENT DOCUMENTS

| | | | |
|---|---|---|---|
| 7,930,397 B2 | 4/2011 | Midgley | |
| 8,195,859 B2* | 6/2012 | Le Moal | G06F 9/5077 |
| | | | 710/200 |
| 9,172,756 B2 | 10/2015 | Ramachandran et al. | |
| 9,438,469 B2 | 9/2016 | Lee et al. | |
| 9,563,463 B2* | 2/2017 | Innan | G06F 9/5088 |
| 9,710,306 B2* | 7/2017 | Duluk, Jr. | G06F 9/4881 |
| 2004/0098718 A1 | 5/2004 | Yoshii et al. | |
| 2006/0056300 A1* | 3/2006 | Tamura | H04L 12/5602 |
| | | | 370/235 |
| 2006/0123422 A1* | 6/2006 | Felter | G06F 9/5083 |
| | | | 718/105 |
| 2011/0191783 A1 | 8/2011 | Le Moal | |
| 2012/0084386 A1 | 4/2012 | Fu | |
| 2013/0227145 A1* | 8/2013 | Wright | H04L 67/1008 |
| | | | 709/226 |
| 2013/0346991 A1* | 12/2013 | Murakami | G06F 9/4881 |
| | | | 718/102 |
| 2014/0089936 A1 | 3/2014 | Chang | |
| 2015/0149813 A1* | 5/2015 | Mizuno | G06F 11/1438 |
| | | | 714/4.11 |
| 2015/0301864 A1* | 10/2015 | Tseng | G06F 9/5088 |
| | | | 718/104 |
| 2018/0027066 A1* | 1/2018 | Van De Groenendaal | |
| | | | G06F 9/4881 |
| | | | 709/226 |
| 2018/0234491 A1* | 8/2018 | Gomes De Oliveira | G06F 8/61 |

FOREIGN PATENT DOCUMENTS

| | | |
|---|---|---|
| CN | 101231551 A | 7/2008 |
| CN | 101685409 A | 3/2010 |
| JP | 2009-277022 A | 11/2009 |
| TW | 200404439 A | 3/2004 |
| TW | 201118593 | 6/2011 |
| TW | 201118593 A | 6/2011 |
| TW | 201216073 A | 4/2012 |
| TW | 201418974 A | 5/2014 |
| TW | 201429205 A | 7/2014 |
| TW | I522922 B | 2/2016 |

OTHER PUBLICATIONS

Beltrán, Marta, and Jose L. Bosque. "Predicting the response time of a new task on a Beowulf cluster." International Conference on Parallel Processing and Applied Mathematics. Springer Berlin Heidelberg, 2003.

Lal, Manoj, and Raju Pandey. "A scheduling scheme for controlling allocation of cpu resources for mobile programs." Autonomous Agents and Multi-Agent Systems 5.1 (2002): 7-43.

Jang, Hye-Churn, and Hyun-Wook Jin. "MiAMI: Multi-core aware processor affinity for TCP/IP over multiple network interfaces." High Performance Interconnects, 2009. HOTI 2009. 17th IEEE Symposium on. IEEE, 2009.

Sudevalayam, Sujesha, and Purushottam Kulkami. "Affinity-aware modeling of cpu usage for provisioning virtualized applications." Cloud Computing (CLOUD), 2011 IEEE International Conference on. IEEE, 2011.

Guo, Zhaoliang, and Qinfen Hao. "Optimization of kvm network based on cpu affinity on multi-cores." Information Technology, Computer Engineering and Management Sciences (ICM), 2011 International Conference on. vol. 4. IEEE, 2011.

TW Notice of Allowance dated Nov. 27, 2017 as received in Application No. 106102081 [English Translation].

TW Office Action dated Nov. 27, 2017 as received in Application No. 106102081 [English Translation].

JP Office Action dated Apr. 3, 2018 as received in Application No. 2017-126171.

CN Office Action in Application No. 201611200418.2 dated Mar. 25, 2020.

* cited by examiner

ALLOCATION METHOD OF CENTRAL PROCESSING UNITS AND SERVER USING THE SAME

CROSS-REFERENCE TO RELATED APPLICATIONS

This non-provisional application claims priority under 35 U.S.C. § 119(a) on Patent Application Nos. 201611200418.2 filed in China on Dec. 22, 2016, the entire contents of which are hereby incorporated by reference.

TECHNICAL FIELD

The disclosure relates to an allocation method of central processing units and a server using the same.

BACKGROUND

People have pursued improved access speeds of storage systems in order to raise efficiency of the storage systems for a long time. However, the efficiency of the storage systems may not be improved significantly because of the limitations of access speeds of traditional hard disk drives (HDD). Therefore, lots of people propose using solid state disks (SSD) instead of traditional hard disk drives (HDD). Under the structure of all flash array (AFA), a high access efficiency between a client equipped with a network card and a server may be achieved by using InfiniBand® standard having characteristics of high speed and low delay transmissions. However, the InfiniBand® standard is expensive and not compatible with Ethernet. Thus, people expect that the high access efficiency could be achieved in the environment of Ethernet. However, the high access efficiency between a client and a server may not be achieved since delays of the network card of the low layer receiving network packets and the network of the upper layer.

SUMMARY

An allocation method, which is adapted to a processing system comprising a plurality of central processing units, is disclosed according to an exemplary embodiment of the present disclosure. The method includes steps of: testing a first efficiency of a server and recording a first number of at least one first central processing unit configured to perform a first type task, a second number of at least one second central processing unit configured to perform a second type task and the first efficiency; determining whether the at least one first central processing unit is in a busy state; increasing the first number of the at least one first central processing unit when the at least one first central processing unit is in the busy state; determining whether a bandwidth occupied by the first type task reaches a maximum bandwidth when the at least one first central processing unit is not in the busy state; increasing the second number of the at least one second central processing unit when the bandwidth occupied by the first type task does not reach the maximum bandwidth; and continuously perform the steps of testing the first efficiency of the server, determining whether the at least one first central processing unit is in the busy state and determining whether the bandwidth occupied by the first type task reaches the maximum bandwidth until the bandwidth occupied by the first type task reaches the maximum bandwidth. Both the first number of the at least one first central processing unit and the second number of the at least one second central processing unit are one in initialization.

A server is disclosed according to an exemplary embodiment of the present disclosure. The server includes at least one hardware queue, at least one software queue, at least one processor and at least one storage unit. The at least one hardware queue is configured to receive at least one network packet. The at least one software queue is configured to reallocate the at least one network packet. The at least one processor includes first central processing units and second central processing units and is configured to process the at least one network packet. The at least one storage unit is configured to store at least one execution instruction. By the at least one execution instruction, the at least one processor is programmed to: test a first efficiency of the server and record the first number of at least one first central processing unit configured to perform a first type task, the second number of at least one second central processing unit configured to perform a second type task and the first efficiency; determine whether the at least one first central processing unit is in a busy state; increase the first number of the at least one first central processing unit when the at least one first central processing unit is in the busy state; determine whether a bandwidth occupied by the first type task reaches a maximum bandwidth when the at least one first central processing unit is not in the busy state; increase the second number of the at least one second central processing unit when the bandwidth occupied by the first type task does not reach the maximum bandwidth; continuously perform the steps of testing the first efficiency of the server, determining whether the at least one first central processing unit is in the busy state and determining whether the bandwidth occupied by the first type task reaches the maximum bandwidth until the bandwidth occupied by the first type task reaches the maximum bandwidth. Both the first number of the at least one first central processing unit and the second number of the at least one second central processing unit are one in initialization.

An allocation method, which is adapted to a processing system comprising a plurality of central processing units, is disclosed according to one embodiment of the present disclosure. The method includes steps of: testing a first efficiency of a server and recording the first number of at least one first central processing unit configured to perform a first type task, the second number of at least one second central processing unit configured to perform a second type task and the first efficiency; decreasing the first number of the at least one first central processing unit by one; determining whether the first number of the at least one first central processing unit is not higher than the second number of the at least one second central processing unit if the first number of the at least one first central processing unit is not equal to zero; increasing the second number and resetting the first number by subtracting the second number from a total number of the plurality of central processing units when the first number is not higher than the second number. The second number of the at least one second central processing unit is one in initialization, and the first number of the at least one first central processing unit is initialized by subtracting the second number from the total number of the plurality of central processing units.

A server is disclosed according to one embodiment of the present disclosure. The server includes at least one hardware queue, at least one software queue, at least one processor and at least one storage unit. The at least one hardware queue is configured to receive at least one network packet. The at least one software queue is configured to reallocate the at least one network packet. The at least one processor includes first central processing units and second central processing units and is configured to process the at least one network packet. The at least one storage unit configured to store at least one execution instruction. By the at least one execution instruction, the at least one processor is programmed to: test a first efficiency of the server and record a first number of at least one first central processing unit configured to perform a first type task, the second number of at least one second central processing unit configured to perform a second type task and the first efficiency; decrease the first number of the at least one first central processing units by one; determine whether the first number of the at least one first central processing unit is not higher than the second number of the at least one second central processing unit if the first number of the at least one first central processing unit is not equal to zero; increase the second number, and reset the first number by subtracting the second number from a total number of a plurality of central processing units when the first number is not higher than the second number. The second number of the at least one second central processing unit is one in initialization, and the first number of the at least one first central processing unit is initialized by subtracting the second number from the total number of the plurality of central processing units.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
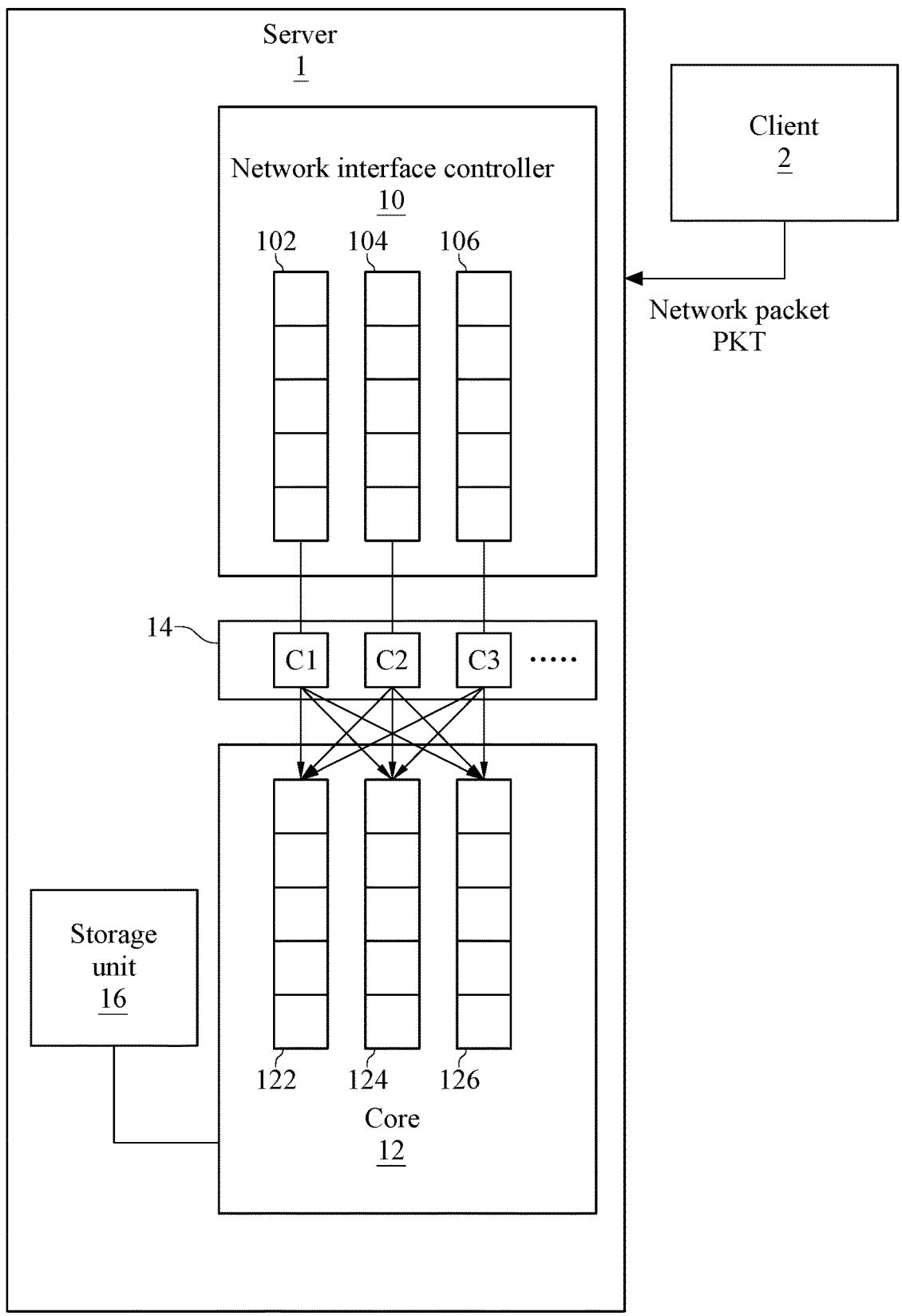
FIG. 1 is a structure diagram of a server according to one embodiment of the present disclosure.

Please refer to FIG. 1, which is a structure diagram of a server according to one embodiment of the present disclosure. As shown in FIG. 1, a server 1 includes a network interface controller (NIC) 10 and a core 12. The network interface controller 10 has a plurality of hardware queues 102-106 configured to receive network packets PKT sent by a client 2. In practice, when the Receive Side Scaling (RSS) is disabled, the network interface controller 10 only has one hardware queue. In contrast, when the Receive Side Scaling (RSS) is enabled, the network interface controller 10 has a plurality of hardware queues (e.g. hardware queues 102-106). The Receive Side Scaling (RSS) is used to make the network interface controller 10 is capable of distributing internet processing loadings to a multi-core processing unit of at least one processor in a multi-core computer, so that the server is capable of processing a high network flow. The plurality of hardware queues respectively correspond to the plurality of central processing units one by one. As shown in the embodiment of FIG. 1, the plurality of hardware queues 102-106 respectively correspond to the central processing units C1-C3 in the processor 14 (in the figure only one processor is shown for illustration only and thus are not limitative of the present disclosure), so the network packets PKT could be distributed to the plurality of central processing units C1-C3 in the processor 14 for processing. The central processing units C1-C3 mentioned in this embodiment are just used for illustrating. In practice, the processor 14 includes more central processing units except the central processing units C1-C3. In this embodiment, a plurality of software queues 122-126 in the core 12 corresponds to the same central processing unit. Therefore, when the loadings of hardware queues 102-106 are unbalanced, the plurality of software queues 122-126 could be used for relocating the network packets PKT so that the loadings of the central processing units C1-C3 become balanced.

Figure 2:
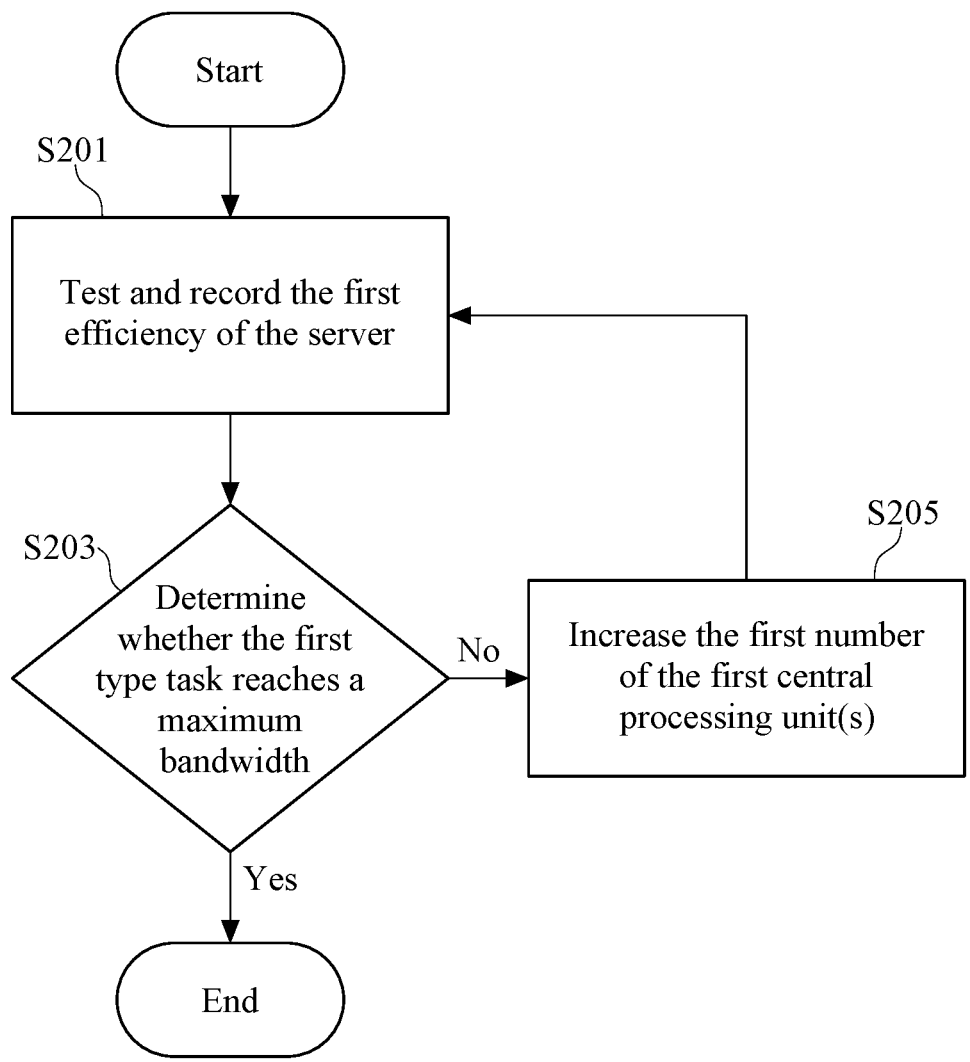
FIG. 2 is a flow chart of allocation method of central processing units according to one embodiment of the present disclosure.

In one embodiment, a plurality of first central processing units (e.g. the central processing units C1-C3) in the processor 14 perform a first type task, so that the network interface controller 10 receives the network packets PKT from the client 2. In one embodiment, the storage unit 16 (in the figure only one storage unit is shown for illustration only and thus are not limitative of the present disclosure) stores at least one execution instruction. The processor 14 tests the first efficiency of the server 1 and records a first number of first central processing unit(s) configured to perform a first type task according to the at least one execution command. Please refer to FIG. 1 and FIG. 2. FIG. 2 is a flow chart of allocation method of central processing units according to one embodiment of the present disclosure. In the embodiment of FIG. 2, the processor 14 initializes the first number of first central processing unit(s) to be one. In step S201, the processor 14 tests and records the first efficiency of the server 1. The first efficiency is obtained through the measurement of Input/Output Operations per Second (IOPS). In the following step S203, the processor 14 determines whether a bandwidth occupied by the first type task reaches a maximum bandwidth. If the bandwidth occupied by the first type task does not reach the maximum bandwidth, then in step S205, increase the first number of first central processing unit(s) and record the first efficiency of the server 1.

In this embodiment, when the network interface controller 10 receives the network packets PKT from the client 2, one first central processing unit among the plurality of central processing units is allocated by the processor 14 to perform the first type task. The aforementioned process is called a hardware interrupt of the network interface controller 10. The processor 14 determines whether the bandwidth occupied by the first type task reaches the maximum bandwidth of the network interface controller 10 by testing. If the bandwidth occupied by the first type task does not reach the maximum bandwidth of the network interface controller 10, then the processor 14 further increases the first number of first central processing unit(s) from one to two and records the first efficiency of the server 1. In this embodiment, the processor 14 gradually increases the first number of first central processing units by continuously performing the aforementioned step until the bandwidth occupied by the first type task reaches the maximum bandwidth of the network interface controller 10. The first number of first central processing unit(s) recorded by the processor 14 is the minimum number of the first central processing unit(s) demanded by the network interface controller 10 when the maximum bandwidth is reached. In this condition that the maximum bandwidth is reached, the processor 14 does not need to allocate other first central processing unit(s) to the network interface controller 10. Instead, the processor 14 allocates the remaining central processing unit(s) to other equipment in the server 1 so that the wastes of resources of central processing units are avoided.

Figure 3:
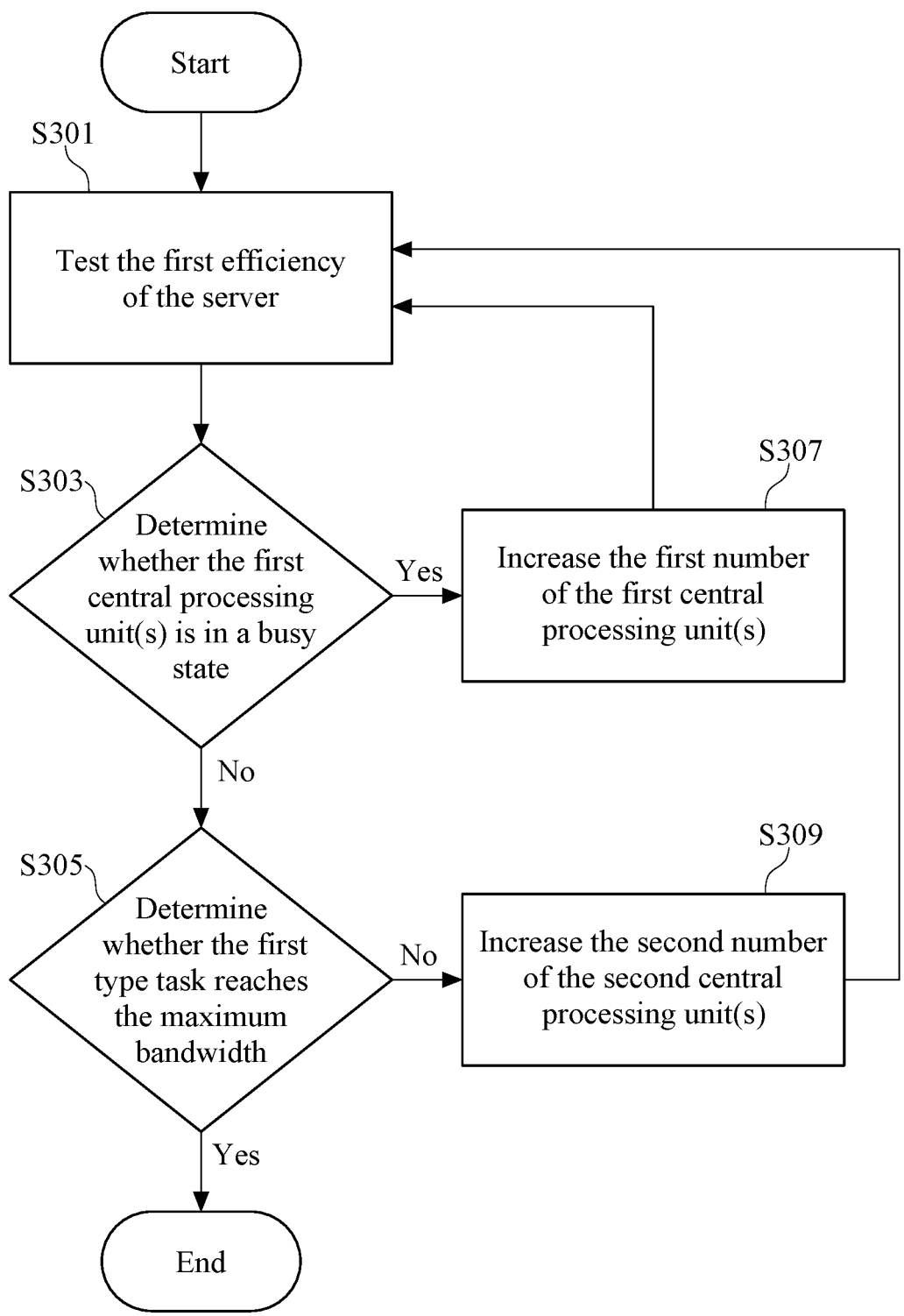
FIG. 3 is a flow chart of allocation method of central processing units according to another embodiment of the present disclosure.

In the aforementioned embodiment, only first type task performed by the first central processing unit(s) is considered. In another embodiment, a second type task performed by a plurality of second central processing unit(s) in the processor 14 is further considered. The second type task is performed so that the internet small computer system interface (iSCSI) target receives and processes the network packets PKT. In practice, the internet small computer system interface is configured to connect the server 1 to the client 2 based on TCP/IP so that information is exchanged between the server 1 and the client 2. The internet small computer system interface target has network threads and worker threads, which are respectively assigned with central processing units configured to process the network packets. Please refer to FIG. 1 and FIG. 3. FIG. 3 is flow chart of allocation method of central processing units according to another embodiment of the present disclosure. In the embodiment of FIG. 3, the processor 14 initializes the first number of first central processing unit(s) to be one for performing the first type task and initializes the second number of second central processing unit(s) to be one for performing the second type task as well. In step S301, the processor 14 tests the first efficiency of the server 1 according to one or more execution instructions and records the first number of first central processing unit(s) configured to perform the first type task and the second number of second central processing unit(s) configured to perform the second type task, as well as the first efficiency. In the following step S303, the processor 14 determines whether the first central processing unit(s) is in a busy state. When the first central processing unit(s) is in the busy state, the processor 14 increases the first number of first central processing unit(s) in step S307. When the first central processing unit(s) is not in the busy state, the processor 14 determines whether a bandwidth occupied by the first type task reaches the maximum bandwidth in step S305. When the bandwidth occupied by the first type task does not reach the maximum bandwidth, increase the second number of second central processing unit(s) in step S309. Continuously perform the steps of testing the first efficiency of the server 1, determining whether the first central processing unit(s) of the server 1 is in the busy state and determining whether the bandwidth occupied by the first type task reaches the maximum bandwidth.

In one embodiment, in step S303, the processor 14 determines whether the first central processing unit(s) is in the busy state includes the following steps. The processor 14 determines whether an amount of occupied resources of the first central processing unit(s) is not lower than a threshold. When the amount of occupied resource of the first central processing unit(s) is not lower than the threshold, the processor 14 determines the first central processing unit(s) is in the busy state. When the amount of occupied resource of first central processing unit(s) is lower than the threshold, the processor 14 determines the first central processing unit(s) is not in the busy state. In one embodiment, the occupied resource is considered as a usage of a first central processing unit. When the usage is higher than a threshold (e.g. 80%), the processor 14 determines the first central processing unit is in the busy state. On the contrary, when the usage is lower than the threshold, the processor 14 determines the first central processing unit is not in the busy state. In another embodiment, the occupied resource is considered as an average usage of a plurality of first central processing units. For example, there are three first central processing units, which respectively have the usages of 85%, 90% and 80%. It is found that the average usage of the three first central processing units is 85%, which is higher than the threshold which is 80%, so the processor 14 determines that the three first central processing units are in the busy state.

In an embodiment, when the bandwidth occupied by the first type task reaches the maximum bandwidth, a table of operating efficiency of the server 1 is obtained. The table of operating efficiency at least includes the first efficiency, the first number and the second number. Please refer to table 1, which is a table of operating efficiency according to one embodiment of the present disclosure. As shown in table 1, after the processor 14 performs the aforementioned step according to the at least one execution instruction, the processor 14 obtains the table of operating efficiency of the server as the bandwidth occupied by the first type task reaches the maximum bandwidth.

TABLE 1

| first number of first central processing units | second number of second central processing units | first efficiency (IOPs) |
| --- | --- | --- |
| 4 | 12 | 820K |
| 3 | 12 | 800K |
| 3 | 11 | 778K |
| 4 | 11 | 771K |
| 3 | 6 | 748K |
| 4 | 7 | 740K |
| 4 | 6 | 737K |
| 3 | 7 | 726K |

As shown in table 1, when the allocation for the first number of first central processing units configured to perform the first type task and the second number of second central processing units configured to perform the second type task changes, the first efficiency obtained changes relatively. In other words, in the condition that the number of central processing units is limited, an ideal allocation for central processing units could be obtained in the table 1 through the aforementioned allocation method. Take table 1 as an example, in the condition that the sum of the first number of first central processing units and the second number of second central processing units is 10, the first efficiency obtained by respectively setting the first number of first central processing units to be 4, and the second number of second central processing units to be 6 would be better than the first efficiency obtained by respectively setting the first number of first central processing units to be 3 and the second number of second central processing units to be 7. From table 1, it is found that in the condition that the second number of second central processing units is 11, the first efficiency obtained by setting the first number of first central processing units to be 3 would be better than the first efficiency obtained by setting the first number of first central processing units to be 4. From the table 1, it is found that the first efficiency obtained by respectively setting the first number of first central processing units to be 3 and the second number of second central processing units to be 6 would be better than the first efficiency obtained by respectively setting the first number of first central processing units to be 4 and the second number of second central processing units to be 7. From the aforementioned embodiments, it is found that the efficiency in the condition that the sum of the first number of first central processing units and the second number of second central processing units is large would not be necessarily better than the efficiency in the condition that the sum of the first number of first central processing units and the second number of second central processing units is small. Moreover, from table 1, it is also found that different allocation methods for the first number of first central processing units and the second number of second central processing units generate different efficiencies in the condition that the sum of the first number of first central processing units and the second number of second central processing units remains consistent. In the condition that resources of central processing units are limited, an allocation method for obtaining the best efficiency could be found by repeatedly testing and recording the efficiency corresponding to each allocation for central processing units trough the allocation method of the present disclosure.

Figure 4:
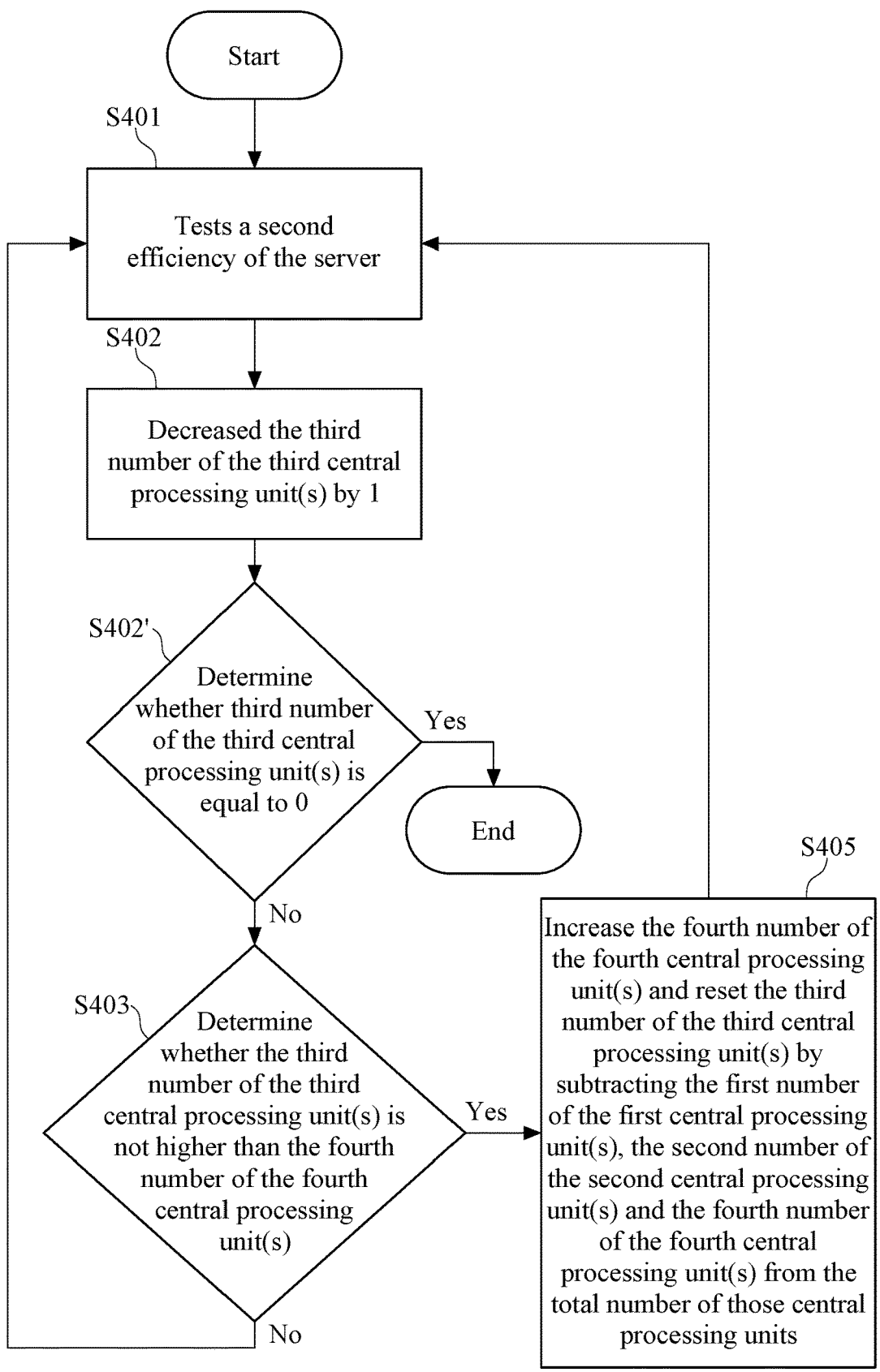
FIG. 4 is a flow chart of allocation method of central processing units according to another embodiment of the present disclosure.

Please refer to FIG. 1 and FIG. 4. FIG. 4 is a flow chart of allocation method of central processing units according to another embodiment of the present disclosure. In this embodiment, the processor 14 further includes third central processing units and fourth central processing units. According to the at least one execution instruction stored in the storage unit 16, the processor 14, in step S401, tests a second efficiency of the server 1 and records a third number of third central processing units configured to perform a third type task, the fourth number of fourth central processing units configured to perform a fourth type task, as well as the second efficiency. In an embodiment, the third type task and the fourth type task respectively correspond to a processing procedure of input/output requests at front end and a processing procedure of read/write at back end in Software Orchestrated Flash Array (SOFA). In this embodiment, the sum of the first number of first central processing units, the second number of second central processing units, the third number of third central processing units and the fourth number of the fourth central processing units is the total number of the central processing units in the server 1. In one example, assume the total number of central processing units in the server 1 is 24, and the sum of the first number of allocated first central processing units and the second number of allocated second central processing units is 13. In this example, the sum of the third number of third central processing units and the fourth number of fourth central processing units set by the processor 14 is 11.

In another embodiment, the sum of the first number of first central processing units, the second number of second central processing units, the third number of third central processing units and the fourth number of fourth central processing units is lower than the total number of central processing units in the server 1. For example, assume the total number of central processing units in the server 1 is 24, the sum of the first number of allocated first central processing units and the second number of allocated second central processing units is 11, and the sum of the third number of allocated third central processing units and the fourth number of allocated fourth central processing units is 10. In other words, in this embodiment, the remaining three central processing units could be used for processing other tasks or remaining idle.

In step S402, the third number of third central processing unit(s) is decreased by 1, and in the following step S402', the processor 14 determines whether third number of third central processing unit(s) is equal to zero. If the third number of third central processing unit(s) is not equal to zero, then in step S403, the processor 14 determines whether the third number of third central processing unit(s) is not higher than the fourth number of fourth central processing units. In step S405, when the third number of third central processing unit(s) is not higher than the fourth number of fourth central processing units, the processor 14 increases the fourth number of fourth central processing unit(s) and resets the third number of third central processing unit(s) by subtracting the first number of first central processing unit (s), the second number of second central processing unit(s) and the fourth number of fourth central processing unit(s) from the total number of those central processing units (first central processing units, second central processing units, third central processing units and fourth central processing units).

In one embodiment, assume the total number of central processing units in the server 1 is 30, and if the sum of the first number of allocated first central processing unit(s) and the second number of allocated second central processing unit(s) is 13, then the third number of third central processing unit(s) and the fourth number of fourth central processing unit(s) allocated by the processor 14 is 11. In this embodiment, the processor 14 initializes the fourth number of fourth central processing unit(s) to be one. At this time, the third number of third central processing unit(s) is 10. In step S401, when the third number of third central processing unit(s) and the fourth number of fourth central processing unit(s) are respectively 10 and 1, the processor 14 tests and records the second efficiency of the server 1, and decreases the third number of third central processing unit(s) by 1 in the next step S402. Moreover, in step S402', the processor 14 determines whether the third number is zero. If the third number is not zero, then in step S403, the processor 14 determines the third number of third central processing unit(s) is not higher than the fourth number of fourth central processing unit(s). In this embodiment, since the third number of third central processing unit(s) is decreased from 10 to 9, which is still higher than the fourth number of fourth central processing unit(s), the processor 14 tests the second efficiency in step S401. After repeating the aforementioned steps, the fourth number of fourth central processing unit(s) is gradually decreased from 10 to 1. At this time, the third number of third central processing unit(s) is equal to the fourth number of fourth central processing unit(s) (both are equal to 1), and the processor 14 increases the fourth number of fourth central processing unit(s) from 1 to 2, and resets the third number of third central processing unit(s) by subtracting the number of first central processing unit(s), the number of second central processing unit(s) and the number of fourth central processing unit(s) from the total number of the central processing units (first central processing units, second central processing units, third central processing units and fourth central processing units) in step S405, wherein the third number becomes 9.

At this time, in step S401, when the third number of third central processing unit(s) and the fourth number of fourth central processing unit(s) are respectively 9 and 2, the processor 14 tests the second efficiency, and repeats the aforementioned steps. When the number of third central processing unit(s) becomes zero, a table of operating efficiency of the server 1 including at least the second efficiency, the number of third central processing unit(s) and the number of fourth central processing unit(s) could be obtained. Please refer to table 1 and table 2. Table 2 is a table of operating efficiency according to one embodiment of the present disclosure. The table of operating efficiency includes at least the second efficiency, the third number and the fourth number. As shown in table 2, the second efficiency of the server 1 changes relatively when the allocation for the third number of third central processing units and the fourth number of fourth central processing units changes. From table 2, it is found that when the third number of third central processing units is 7, the second efficiency obtained by setting the fourth number of fourth central processing units to be 2 would be better than the second efficiency obtained by setting the fourth number of fourth central processing units to be 3. In other words, the second efficiency in the condition of the sum of the third number of third central processing units and the fourth number of fourth central processing units is small may be better than the second efficiency in the condition that the sum of the third number of third central processing units and the fourth number of fourth central processing units is large. In other words, through a table of operating efficiency, which is obtained by repeatedly performing the aforementioned allocation method of central processing units, the processor 14 could obtain an improved allocation of central processing units in the condition that resources of central processing units are limited, so that the wastes of resources may be avoided and the efficiency of the server 1 may be raised.

TABLE 2

| third number of third central processing units | fourth number of fourth central processing units | second efficiency (IOPs) |
|---|---|---|
| 9 | 2 | 732K |
| 7 | 2 | 717K |
| 7 | 3 | 710K |
| 6 | 2 | 659K |
| 5 | 2 | 639K |
| 4 | 2 | 611K |
| 3 | 1 | 511K |

In one embodiment, when the server 1 has 24 central processing units and the 24 central processing units are allocated for performing the aforementioned four tasks, the number of combinations of allocating the 24 central processing units is 1771. However, through the allocation method of the present disclosure, the number of combinations of allocating the 24 central processing units generated in the table of operating efficiency of the server is lower than 1771. For example, if 13 central processing units are allocated for performing the first type task and the second type task, and the remaining 11 central processing units are allocated for performing the third type task and the fourth type task, the number of combinations of allocating the 24 central processing units is around a hundred by using the allocation method of the present disclosure. Therefore, the testing procedures and time for allocating the central processing units are saved.

Figure 5:
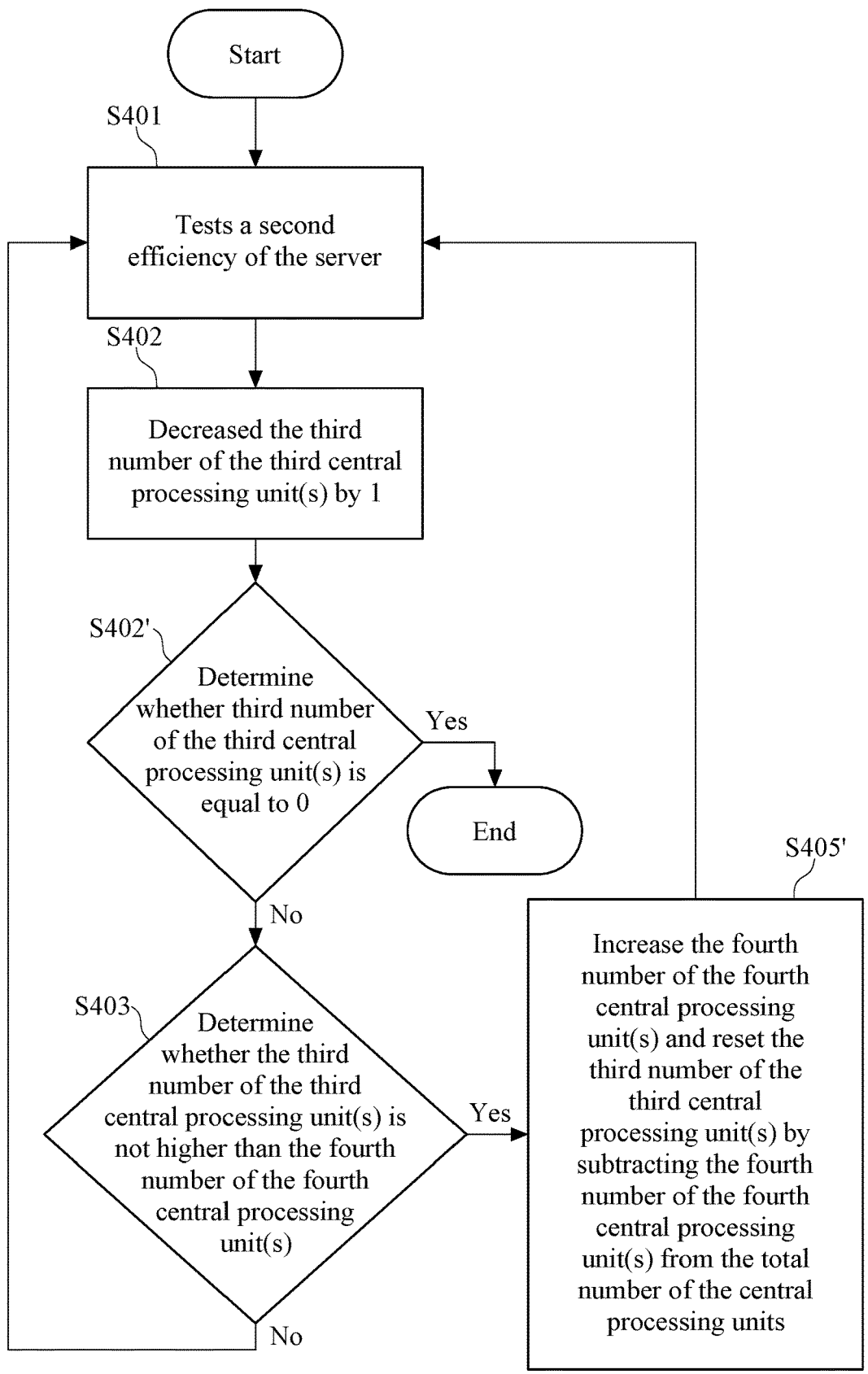
FIG. 5 is a flow chart of allocation method of central processing units according to another embodiment of the present disclosure.

In the aforementioned embodiment, the allocation method for the third type task and the fourth type task related to SOFA, as well as the first type task and the second type task is disclosed. However, in another embodiment, the allocation method is for the third type task and the fourth type task only. Please refer to FIG. 5, which is a flow chart of allocation method of central processing units according to another embodiment of the present disclosure. The steps shown in FIG. 5 are similar to the steps shown in FIG. 4, so not repeated here. The only difference between FIG. 5 and FIG. 4 is that in step S405' of FIG. 5, the third number of third central processing units is obtained by subtracting the fourth number of fourth central processing units from the total number of the central processing units (the third central processing units and the fourth central processing units). In other words, in this embodiment, the first number of first central processing units and the second number of second central processing units are not considered.

Based on the above descriptions, in the allocation method of central processing units and the operations of the server, the number of first central processing units is increased selectively by determining the loadings of the first central processing units. Moreover, the second number of second central processing units is increased selectively by determining whether the bandwidth occupied by the first type task reaches a maximum bandwidth. Repeatedly perform the aforementioned steps. Therefore, an ideal allocation method for central processing units is obtained and then the overall efficiency of the server is improved.

Although the invention has been described above with reference to aforementioned embodiments, which, however, are not intended to limit the invention. Various changes and modifications that be made therein without departing from the spirit and scope of the invention are within the invention claimed scope. Accordingly, the scope of protection of the invention is defined by the appended claims.

What is claimed is:

1. An allocation method, which is adapted to a server comprising a network interface controller having at least one hardware queue configured to receive network packets from a client, and a plurality of central processing units, the allocation method comprising:
   initializing a first number of at least first central processing unit to be one for performing a first type task and initializing a second number of at least second central processing unit to be one for performing a second type task;
   testing a first efficiency of the server and recording the first number of the at least one first central processing unit configured to perform the first type task, the second number of the at least one second central processing unit configured to perform the second type task, and the first efficiency, wherein the first efficiency is obtained through a measurement of Input/output Operations per Second;
   determining whether the at least one first central processing unit is in a busy state, wherein when a usage of the at least one first central processing unit is higher than a threshold, the at least one first central processing unit is in the busy state;
   increasing the first number of the at least one first central processing unit by one when the at least one first central processing units is in the busy state;
   repeating the steps of testing the first efficiency of the server, determining whether the at least one first central processing unit is in the busy state, and increasing the first number of the at least one first central processing unit by one when the at least one first central processing unit is in the busy state, until the at least one first central processing unit is no longer in the busy state;
   determining whether a bandwidth occupied by the first type task reaches a maximum bandwidth of the network interface controller when the at least one first central processing unit is not in a busy state;

increasing the second number of the at least one second central processing unit by one when the bandwidth occupied by the first type task does not reach the maximum bandwidth;

repeating the steps of testing the first efficiency of the server, determining whether the at least one first central processing unit is in the busy state, determining whether the bandwidth occupied by the first type task reaches the maximum bandwidth, and increasing the second number of the at least one second central processing unit by one when the bandwidth occupied by the first type task does not reach the maximum bandwidth until the bandwidth occupied by the first type task reaches the maximum bandwidth; and generating a table of the first operating efficiency of the server, wherein the table at least comprises the first efficiency, the first number and the second number.

2. The allocation method according to claim 1, wherein the determining whether the at least one first central processing unit is in the busy state comprises:

determining whether an amount of occupied resource of the at least one first central processing unit is not lower than a threshold, wherein determining that the at least one first central processing unit is in the busy state when the amount of occupied resource of the first central processing units is not lower than the threshold; and determining that the at least one first central processing unit is not in the busy state when the amount of occupied resource of the at least one first central processing unit is lower than the threshold.

3. The allocation method according to claim 1, further comprising:

testing a second efficiency of the server and recording a third number of at least one third central processing unit configured to perform a third type task, a fourth number of at least one fourth central processing unit configured to perform a fourth type task, and the second efficiency;

decreasing the third number of the at least one third central processing unit by one; and determining whether the third number of the at least one third central processing unit is not higher than the fourth number of the at least one fourth central processing unit if the third number of the at least one third central processing unit is not equal to zero, increasing the fourth number and resetting the third number by subtracting the first number, the second number and the fourth number from a total number of the plurality of central processing units when the third number is not higher than the fourth number, wherein the fourth number of the at least one fourth central processing unit is one in initialization, and the third number of the at least one third central processing unit is initialized by subtracting the first number, the second number and the fourth number from the total number of the plurality of central processing units.

4. The allocation method according to claim 3, further comprising:

obtaining a table of second operating efficiency of the server when the third number of the at least one third central processing unit is equal to zero, wherein the table of second operating efficiency at least comprises the second efficiency, the third number and the fourth number.

5. A server, comprising:

a network interface controller having at least one hardware queue configured to receive at least one network packet from a client;

at least one software queue configured to reallocate the at least one network packet;

at least one processor, each processor comprising at least one first central processing unit and at least one second central processing unit and configured to process the at least one network packet;

at least one storage unit configured to store at least one execution instruction by which the at least one processor is programmed for:

initializinq a first number of at least first central processinq unit to be one for performing a first type task and initializing a second number of at least second central processinq unit to be one for performinq a second type task;

testing a first efficiency of the server and recording the first number of the at least one first central processing unit configured to perform the first type task, the second number of the at least one second central processing unit configured to perform the second type task, and the first efficiency, wherein the first efficiency is obtained through a measurement of Input/output Operations per Second;

determining whether the at least one first central processing unit is in a busy state, wherein when a usage of the at least one first central processing unit is higher than a threshold, the at least one first central processing unit is in the busy state;

increasing the first number of the at least one first central processing unit by one when the at least one first central processing units is in the busy state;

repeating the steps of testing the first efficiency of the server, determining whether the at least one first central processing unit is in the busy state, and increasing the first number of the at least one first central processing unit by one when the at least one first central processing unit is in the busy state, until the at least one first central processing unit is no longer in the busy state;

determining whether a bandwidth occupied by the first type task reaches a maximum bandwidth of the network interface controller when the at least one first central processing unit is not in a busy state;

increasing the second number of the at least one second central processing unit by one when the bandwidth occupied by the first type task does not reach the maximum bandwidth;

repeating the steps of testing the first efficiency of the server, determining whether the at least one first central processing unit is in the busy state, determining whether the bandwidth occupied by the first type task reaches the maximum bandwidth, and increasing the second number of the at least one second central processing unit by one when the bandwidth occupied by the first type task does not reach the maximum bandwidth until the bandwidth occupied by the first type task reaches the maximum bandwidth; and generating a table of the first operating efficiency of the server, wherein the table at least comprises the first efficiency, the first number and the second number.

6. The server according to claim 5, wherein the at least one processor determines that the at least one first central processing unit are in the busy state when an amount of occupied resource of the at least one first central processing unit is not lower than a threshold, and the at least one processor determines that the at least one first central processing unit is not in the busy state when the amount of occupied resource of the at least one first central processing unit is lower than the threshold.

7. The server according to claim 5, wherein the at least one processor further comprises at least one third central processing unit and at least one fourth central processing unit configured to process the at least one network packet, and the at least one processor is further used for:
testing a second efficiency of the server and recording a third number of the at least one third central processing unit configured to perform a third type task, a fourth number of the at least one fourth central processing unit configured to perform a fourth type task and the second efficiency;
decreasing the third number of the at least one third central processing unit by one; and
determining whether the third number of the at least one third central processing unit is not higher than the fourth number of the at least one fourth central processing unit if the third number of the at least one third central processing unit is not equal to zero, increasing the fourth number and resetting the third number by subtracting the first number, the second number and the fourth number from a total number of a plurality of central processing units in a processing system when the third number is not higher than the fourth number, wherein the fourth number of the at least one fourth central processing unit is one in initialization, and the third number of the at least one third central processing unit is initialized by subtracting the first number, the second number and the fourth number from the total number of the plurality of central processing units.

8. The server according to claim 7, wherein the at least one processor acquires a table of second operating efficiency of the server when the third number of the at least one third central processing unit is equal to zero, wherein the table of second operating efficiency at least comprises the second efficiency, the third number and the fourth number.

9. An allocation method, which is adapted to a server comprising a network interface controller having at least one hardware queue configured to receive at least one network packet from a client, and a plurality of central processing units, comprising:
initializing a second number of at least second central processing unit to be one for performing a second type task and initializing a first number of at least first central processing unit to the remainder of the plurality of processing units;
testing a first efficiency of the server and recording the first number of at least one first central processing unit configured to perform the first type task, the second number of at least one second central processing unit configured to perform the second type task and the first efficiency, wherein the first efficiency is obtained through a measurement of Input/output Operations per Second;
decreasing the first number of the at least one first central processing unit by one via a processor;
determining whether the first number of the at least one first central processing unit is equal to zero;
when the first number of the at least one first central processing unit is not equal to zero, determining whether the first number of the at least one first central processing unit is not higher than the second number of the at least one second central processing unit;
in response to determining that the first number of the at least one first central processing unit is not higher than the second number of the at least one second central processing unit, repeating the steps of testing the first efficiency of the server, decreasing the first number of the at least one first central processing unit by one, determining whether the first number of the at least one first central processing unit is equal to zero, and determining whether the first number of the at least one first central processing unit is not higher than the second number of the at least one second central processing unit when the at least one first central processing unit is not equal to zero, until the first number of the at least one first central processing unit and the second number of the at least one second central processing unit are equal;
increasing the second number of the at least one second central processing unit by one and reset the first number of the at least one first central processing unit to a value obtained by subtracting the second number from a sum of first number and the second number;
repeating the steps of testing the first efficiency of the server, decreasing the first number of the at least one first central processing unit by one, determining that the first number of the at least one first central processing unit is equal to zero, determining whether the first number of the at least one first central processing unit is not higher than the second number of the at least one second central processing unit when the first number of the at least one first central processing unit is not equal to zero, increasing the second number of the at least one second central processing unit by one and resetting the first number, until the first number of the at least one first central processing unit is equal zero; and
generating a table of the first operating efficiency of the server, wherein the table at least comprises the first efficiency, the first number and the second number.

10. A server, comprising:
a network interface controller having at least one hardware queue configured to receive at least one network packet from a client;
at least one software queue configured to reallocate the at least one network packet;
at least one processor comprising at least one first central processing unit and at least one second central processing unit and configured to process the at least one network packet;
at least one storage unit configured to store at least one execution instruction by which the at least one processor is programmed for:
initializing a second number of at least second central processing unit to be one for performing a second type task and initializing a first number of at least first central processing unit to the remainder of the plurality of processing units;
testing a first efficiency of the server and recording the first number of at least one first central processing unit configured to perform the first type task, the second number of at least one second central processing unit configured to perform the second type task and the first efficiency, wherein the first efficiency is obtained through a measurement of Input/output Operations per Second;
decreasing the first number of the at least one first central processing unit by one via a processor;
determining whether the first number of the at least one first central processing unit is equal to zero;

when the first number of the at least one first central processing unit is not equal to zero, determining whether the first number of the at least one first central processing unit is not higher than the second number of the at least one second central processing unit;

in response to determining that the first number of the at least one first central processing unit is not higher than the second number of the at least one second central processing unit, repeating the steps of testing the first efficiency of the server, decreasing the first number of the at least one first central processing unit by one, determining whether the first number of the at least one first central processing unit is equal to zero, and determining whether the first number of the at least one first central processing unit is not higher than the second number of the at least one second central processing unit when the at least one first central processing unit is not equal to zero, until the first number of the at least one first central processing unit and the second number of the at least one second central processing unit are equal;

increasing the second number of the at least one second central processing unit by one and reset the first number of the at least one first central processing unit to a value obtained by subtracting the second number from a sum of first number and the second number;

repeating the steps of testing the first efficiency of the server, decreasing the first number of the at least one first central processing unit by one, determining that the first number of the at least one first central processing unit is equal to zero, determining whether the first number of the at least one first central processing unit is not higher than the second number of the at least one second central processing unit when the first number of the at least one first central processing unit is not equal to zero, increasing the second number of the at least one second central processing unit by one and resetting the first number, until the first number of the at least one first central processing unit is equal zero; and generating a table of the first operating efficiency of the server, wherein the table at least comprises the first efficiency, the first number and the second number.

* * * * *